H. J. BRENNECKE.
EYEGLASSES.
APPLICATION FILED AUG. 6, 1915.

1,210,038.

Patented Dec. 26, 1916.

Witness:
R. Bauerle

Inventor:
Herman J. Brennecke

UNITED STATES PATENT OFFICE.

HERMAN J. BRENNECKE, OF CHICAGO, ILLINOIS, ASSIGNOR OF ONE-HALF TO ROBERT MALCOM, OF CHICAGO, ILLINOIS.

EYEGLASSES.

1,210,038.   Specification of Letters Patent.   Patented Dec. 26, 1916.

Application filed August 6, 1915.   Serial No. 43,936.

*To all whom it may concern:*

Be it known that I, HERMAN J. BRENNECKE, a citizen of the United States, residing at Chicago, in the county of Cook and State of Illinois, have invented certain new and useful Improvements in Eyeglasses, of which the following is a specification.

My invention relates to fittings for eyeglasses, goggles and the like, and has particular reference to means for connecting the lenses in a serviceable manner, which in this art requires a construction which not only operates mechanically, but is also pleasing in appearance.

With this object in view the invention consists of the novel construction, combination and arrangement of parts, hereinafter described in detail, illustrated in the accompanying drawing and incorporated in the appended claim.

Figure 1:
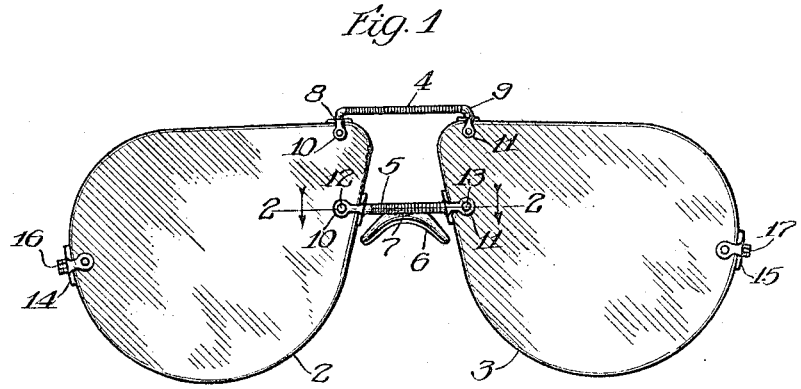
Figure 2:
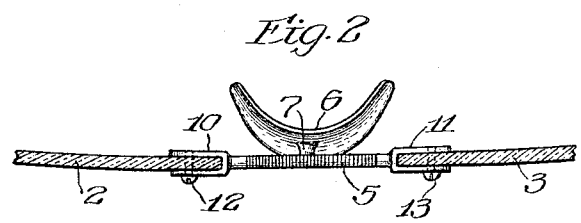

In the drawing Figure 1 is a side elevation of a pair of lenses connected in accordance with my invention. Fig. 2 is an enlarged section taken on line 2—2 of Fig. 1.

In the present improvement the lenses 2 and 3, which are comparatively large and heavy, are connected by means of two flexible bridges 4 and 5, the latter carrying a nose piece which is preferably soldered onto the bridge 5, 7 representing the connective portion. The upper bridge 4 is arranged above the upper edges of the lenses and has lens-engaging jaws 8 and 9, similar to jaws 10 and 11 for the nose piece bridge 5, which project at right angles to line of the bridge. These bridges are designed to support each lens against movement relative to the other lens by reason of its weight, or of force of gravity, and are therefore made sufficiently rigid to perform this function while at the same time readily responsive to forcible flexing by the user. Each bridge is in the form of a cable consisting of a core of spring wire having an intermediate portion covered by a coil of wire, or wire woven on the core. On the ends of the core are the jaws and these are secured in the usual manner by means of screws or rivets 12 and 13. 14 and 15 are the usual pivot-supporting fittings for the temples or bows 16 and 17.

The construction herein shown and described involves practically a minimum of cost of construction, and is substantial and of neat appearance. The herein described construction also supplies the demand for novelty in eye-glass and goggle forms.

I claim as my invention—

The combination with a pair of lenses, of an upper and a lower bridge, each having rigid jaw ends, the jaws of the upper bridge extending at right angles thereto and gripping the lenses from above, the jaws of the lower bridge engaging the adjacent edges of the lenses, and a nose-piece which is substantially an integral part of the lower bridge, said bridges having a construction sufficiently rigid to carry the weight of one lens upon the other without flexing, and yet permitting relative angular movement of the lenses.

In testimony whereof I have hereunto signed my name.

HERMAN J. BRENNECKE.

Copies of this patent may be obtained for five cents each, by addressing the "Commissioner of Patents, Washington, D. C."